United States Patent [19]

Linde et al.

[11] Patent Number: 4,903,463
[45] Date of Patent: Feb. 27, 1990

[54] RECIPROCATING LOBED CONDITIONING ROLLS

[75] Inventors: Gilbert W. Linde; Emmett G. Webster, both of New Holland, Pa.

[73] Assignee: Ford New Holland, Inc., New Holland, Pa.

[21] Appl. No.: 325,278

[22] Filed: Mar. 17, 1989

[51] Int. Cl.⁴ ............................................. A01D 82/00
[52] U.S. Cl. .......................................... 56/1; 56/16.4; 56/DIG. 1
[58] Field of Search ...................... 56/1, 16.4, DIG. 1, 56/DIG. 2, DIG. 23; 100/70 A, 176; 34/127; 29/121.1, 121.2

[56] References Cited

U.S. PATENT DOCUMENTS

| | | | |
|---|---|---|---|
| 2,464,974 | 3/1949 | Garvey | 56/DIG. 1 |
| 3,043,073 | 7/1962 | Bornzin | 56/DIG. 1 |
| 3,488,929 | 1/1970 | Hale | 56/1 |
| 3,513,645 | 5/1970 | Garrett et al. | 56/1 |
| 3,712,034 | 1/1973 | Praca | 56/DIG. 1 |
| 3,854,974 | 12/1974 | Sato et al. | 100/176 |
| 3,890,770 | 6/1975 | Milliken | 56/DIG. 1 |
| 4,035,991 | 7/1977 | Oosterling et al. | 56/1 |
| 4,172,353 | 10/1979 | Meek et al. | 56/DIG. 1 |
| 4,216,641 | 8/1980 | Koch et al. | 56/DIG. 1 |
| 4,446,678 | 5/1984 | Smith | 56/DIG. 1 |
| 4,472,927 | 9/1984 | Vogt et al. | 56/16.4 |
| 4,516,392 | 5/1985 | McLean et al. | 56/16.4 |

FOREIGN PATENT DOCUMENTS

| | | | |
|---|---|---|---|
| 1183297 | 12/1964 | Fed. Rep. of Germany | 56/DIG. 1 |
| 0217110 | 8/1968 | U.S.S.R. | 56/DIG. 1 |
| 0686661 | 10/1969 | U.S.S.R. | 56/DIG. 1 |

Primary Examiner—Stephen J. Novosad
Assistant Examiner—Terry Lee Melius
Attorney, Agent, or Firm—Larry W. Miller; Frank A. Seemar; Darrell F. Marquette

[57] ABSTRACT

A conditioning roll for use in a conditioning mechanism on a hay harvesting machine is disclosed wherein the conditioning roll is formed by a plurality of individual lobes slidably mounted on transverse guide members detachably affixed to a core member. Each lobe is connected to a lobe reciprocating apparatus for effecting a transverse reciprocating sliding movement with respect to the core of the conditioning roll while the respective conditioning roll is being rotated. The conditioning mechanism is provided with a pair of intermeshing conditioning rolls connected to respective lobe reciprocating apparatus so that the lobes on the respective conditioning rolls are transversely moving in opposite directions at the throat formed between the rolls through which crop material passes to be conditioned in an aggressive manner.

19 Claims, 4 Drawing Sheets

RECIPROCATING LOBED CONDITIONING ROLLS

BACKGROUND OF THE INVENTION

This invention relates generally to hay harvesting machines and, more particularly, to a conditioning roll having individually reciprocal lobes for achieving a more aggressive and extensive conditioning of the hay crop.

Hay harvesting machines commonly referred to as mower-conditioners or windrowers, utilize a crop harvesting header to sever the hay crop from the ground and convey it rearwardly to a conditioning mechanism operable to crush or crimp the severed crop material at spaced apart intervals along the stem of the crop to facilitate the drainage of liquids from the crop material plant. Conditioning mechanisms of the type utilizing a pair of counterrotating, intermeshing conditioning rolls are usually provided with transversely extending lugs or flutes to effect conditioning of the severed crop material in a manner described in greater detail in U.S. Pat. No. 3,488,929 issued to J. K. Hale.

Although the individual crop material plant, which generally has a waxy stem, has been broken in several places by the operation of the intermeshing flutes on the conditioning rolls, the liquids within the plant still require significant time to escape from the plant to permit satisfactory conditions under which the dried crop material can be baled and then removed from the field. A more rapid drying of liquids from the conditioned crop material could be obtained if the waxy stem of the crop material plant were split along the length thereof, providing a more accessible means for the liquid to escape from the plant.

Accordingly, it would be desireable to provide a conditioning mechanism that could provide a more aggressive and extensive conditioning of the harvested crop material to decrease the length of time required to lower the moisture content of the conditioned crop material so that the crop can be collected and removed from the field without the use of chemical treatment to accelerate the drying process.

SUMMARY OF THE INVENTION

It is an object of this invention to overcome the aforementioned disadvantages of the prior art by providing a conditioning roll having individual lobes slidably mounted for transverse reciprocation.

It is another object of this invention to provide a conditioning roll capable of transverse reciprocal movement relative to the other conditioning roll in a crop conditioning mechanism having a pair of counterrotating conditioning rolls.

It is an advantage of this invention that superior conditioning of forage crops can be obtained.

It is a feature of this invention that the lobes circumferentially mounted around the core of a conditioning roll are independently slidable.

It is another advantage of this invention that the drying of a forage crop is hastened.

It is another feature of this invention that the forage crop is subjected to two conditioning actions, one from the conventional crushing action of lobed intermeshing conditioning rolls and the other from the relative axial sliding action between the rolls while engaged with the forage crop.

It is still another advantage of this invention that the individual crop material plant is conditioned along the length of its stalk.

It is still another object of this invention that the lobes are connectable to an oscillating mechanism to effect transverse reciprocation.

It is still another feature of this invention that the lobes can be connected to the lobe reciprocating apparatus in such a manner as to reciprocate lobes on opposing sides of the conditioning roll core in opposite directions.

It is yet another advantage of this invention that the transverse movements of the lobes on each conditioning roll are counterbalanced without the need for additional counterweights.

It is yet another feature of this invention that the lobe reciprocating apparatus for each of the counterrotating conditioning rolls are arranged such that the adjacent lobes on the respective rolls are moving in opposing directions.

It is yet another object of this invention to provide a conditioning mechanism that can be utilized in a standard hay harvesting machine while attaining superior conditioning of the crop material.

It is a further object of this invention to provide a reciprocating lobed conditioning roll which is durable in construction, inexpensive of manufacture, carefree of maintenance, facile in assemblage, and simple and effective in use.

These and other objects, features and advantages are accomplished according to the instant invention by providing a conditioning roll for use in a conditioning mechanism on a hay harvesting machine wherein the conditioning roll is formed by a plurality of individual lobes slidably mounted on transverse guide members detachably affixed to a core member. Each lobe is connected to a lobe reciprocating apparatus for effecting a transverse reciprocating sliding movement with respect to the core of the conditioning roll while the respective conditioning roll is being rotated. The conditioning mechanism is provided with a pair of intermeshing conditioning rolls connected to respective lobe reciprocating apparatus so that the lobes on the respective conditioning rolls are transversely moving in opposing directions at the throat formed between the rolls through which crop material passes to be conditioned in an aggressive manner.

BRIEF DESCRIPTION OF THE DRAWINGS

The advantages of this invention will become apparent upon consideration of the following disclosure of the invention, especially when taken in conjunction with the accompanying drawings wherein.

DETAILED DESCRIPTION OF THE PREFERRED EMBODIMENT

Figure 1:
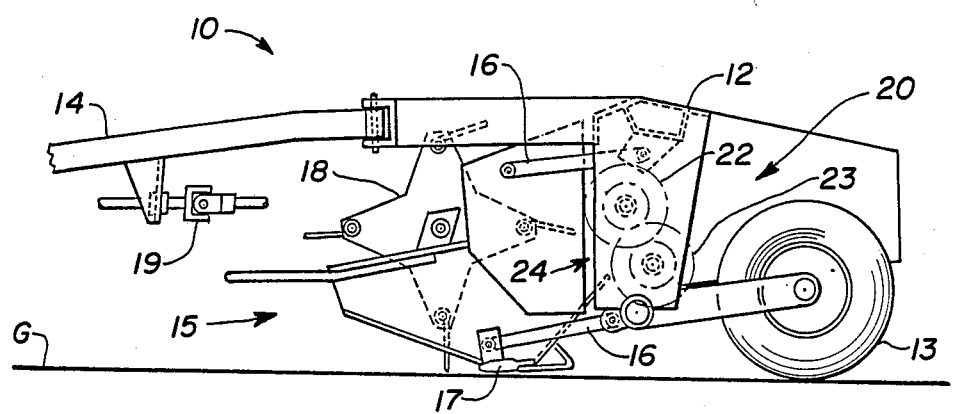
FIG. 1 is a side elevational view of a hay harvesting machine incorporating the principles of the instant invention.
Figure 2:
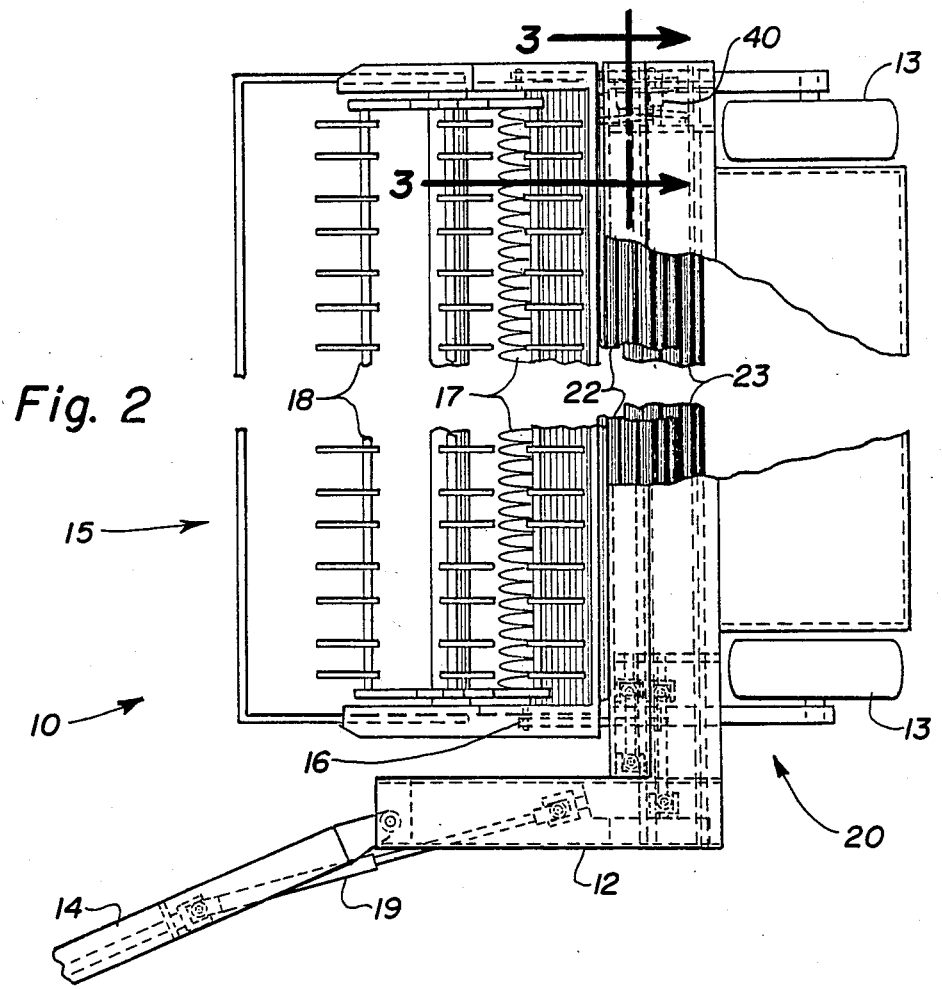
FIG. 2 is a top plan view of the hay harvesting machine seen in FIG. 1 with the center portion thereof broken away for purposes of clarity.

Referring now to the drawings and, particularly, to FIGS. 1 and 2, a hay harvesting machine, commonly referred to as a pull-type mower-conditioner, incorporating the principles of the instant invention, can best be seen. Any left and right references are used as a matter of convenience and are determined by standing at the rear of the machine, facing the forward end, the direction of travel.

The mower-conditioner 10 is provided with a frame 12 adapted for mobile movement over the ground G by wheels 13 rotatably mounted thereon. The frame 12 is provided with a pivotal draw bar 14 which extends forwardly therefrom for connection to a prime mover (not shown), such as a tractor, in a conventional manner. The frame 12 supports a header 15 by flotation linkage 16 for generally vertical movement relative to the ground G as is conventionally known. The header 15 includes a conventional cutter bar 17 operable to sever standing crop material from the ground G and a reel 18 rotatably operable in a conventional manner to convey the severed crop material rearwardly to the conditioning mechanism 20. The drive mechanism 19 is supported from the draw bar 14 and the frame 12 to transfer rotational power from the prime mover in a conventional manner to the operable components of the mower-conditioner 10.

The conditioning mechanism 20 is shown mounted in the frame 12 rearwardly of the header 15 to receive severed crop material conveyed rearwardly therefrom by the reel 18. The conditioning mechanism 20 is provided with a rotatable upper roll 22 and a counterrotating lower roll 23 positioned for intermeshing engagement therewith to define a throat 24 into which the severed crop material is fed so as to pass between the counterrotating conditioning rolls 22, 23. Each conditioning roll 22, 23 has a lobed construction, which will be described in greater detail below, providing an intermeshing configuration to crush the crop material passing longitudinally therebetween in a conventional manner.

Figure 3:
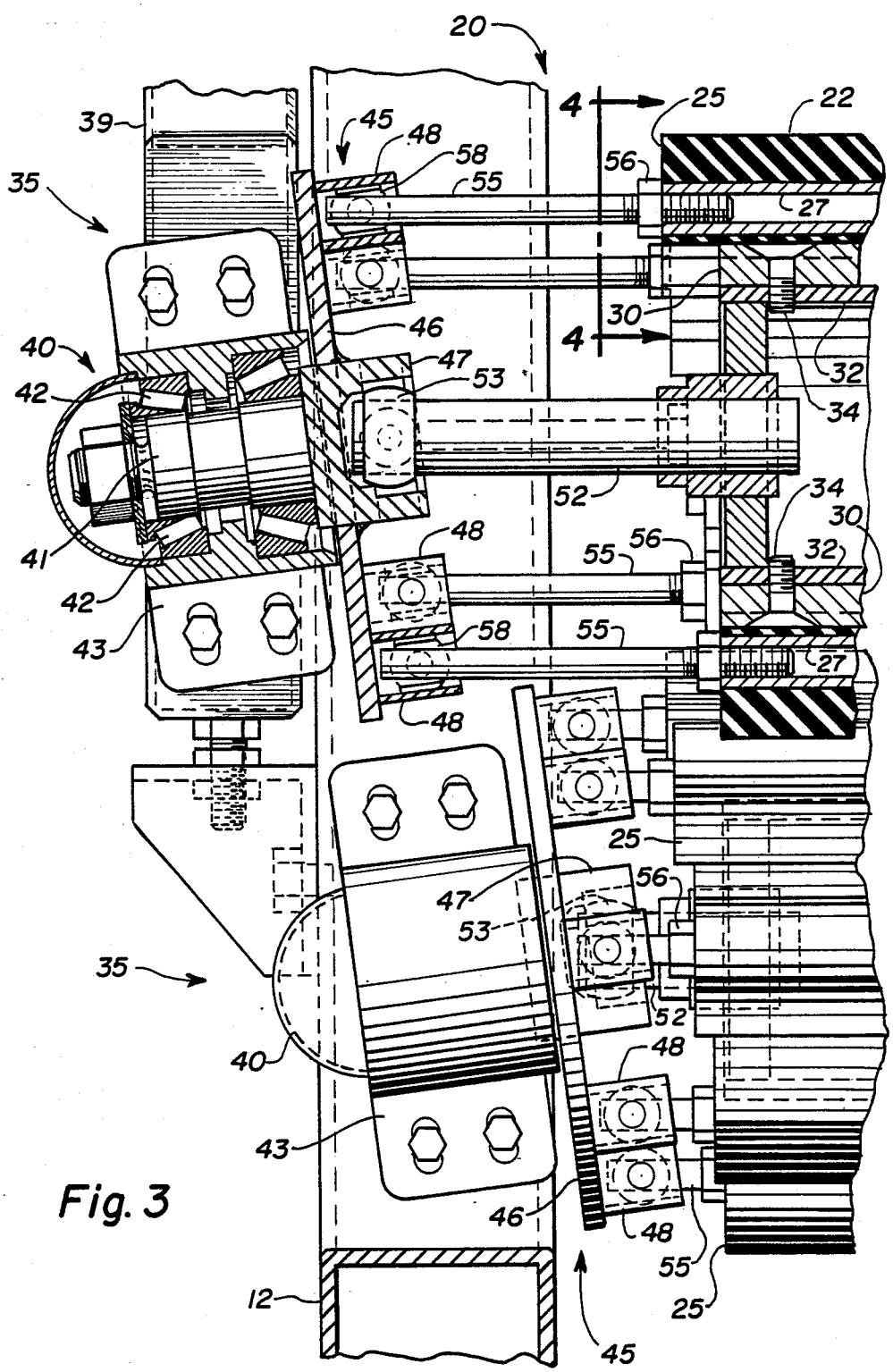
FIG. 3 is a partial cross-sectional view taken along lines 3—3 of FIG. 2 to depict the connection of the lobe reciprocate to the lobed conditioning rolls.
Figure 4:
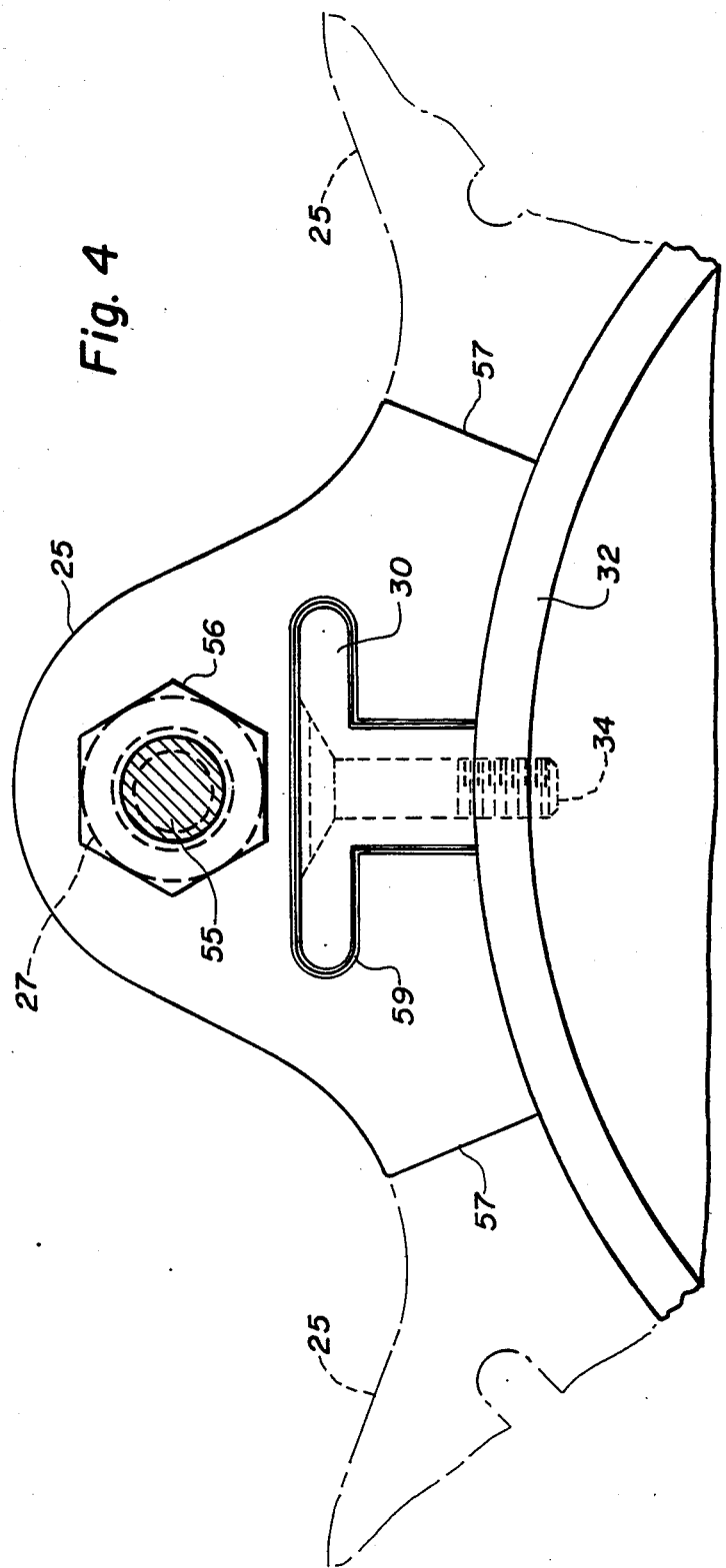
FIG. 4 is enlarged partial cross-sectional view of the upper conditioning roll taken along lines 4—4 of FIG. 3 to show the details of the mounting of one of the slidable lobes on the core of the upper conditioning roll.

Referring now to FIGS. 3 and 4, the details of the reciprocal lobes 25 can best be seen. Each lobe 25 is constructed of an elastomeric material such as urethane with a hardness of 70 durometer "A". The urethane is bonded to a support tube 27 extending preferably the entire length of the lobe 25. The lobe 25 is slidably mounted on a guide rail 30 affixed to the core 32 of the conditioning roll 22, 23. The guide rail 30 preferably extends substantially the entire length of the core 32 which is preferably slightly shorter than the lobes 25 so that the core 32 is not exposed during the transversely reciprocating movements of the lobes 25 as will be described in greater detail below. The guide rails 30 are preferably detachably connected to the core 32 by fasteners 34 to facilitate repair and/or maintenance of the guide rails 30.

The lobes 25 are shown as having a curved configuration to provide a more extensive conditioning of the crop material; however, alternative configurations could also be provided. Such alternative configurations could have angled bends to provide crimping of the crop material at regular intervals as the crop material is fed longitudinally through the conditioning mechanism 20. However, it is necessary according to the principles of the instant invention that the lobes 25 extend linearly parallel to the axis of the conditioning roll 22, 23 because of the transverse reciprocal movement induced to the lobes described in greater detail below.

The individual lobes 25 are connected to an oscillating mechanism 35 to effect reciprocation in a transverse direction along the core 32. The oscillating mechanism 35 could take many forms; however, the preferred embodiment is a lobe reciprocating apparatus 40 described in greater detail below. Although a conditioning action could be attained by reciprocating the lobes 25 on one of the conditioning rolls 22, 23, an equal amount of relative transverse movement can be acquired with less individual lobe 25 movement if both the upper roll 22 and the lower roll 23 have their respective lobes 25 connected to an oscillating mechanism 35 to effect the corresponding transverse reciprocal movement.

The lobe reciprocating apparatus 40 has a hub 41 whose axis is tilted with respect to the line of the core 32. The hub 41 is rotatably supported by bearings 42 mounted in a housing 43 affixed to the frame 12. As with conventional conditioning mechanisms, the upper roll 22 is mounted on swing arms 39 to permit generally vertical movement of the upper roll 22 relative to the lower conditioning roll 23. As a result, the housing 43 for the lobe reciprocating apparatus 40 corresponding to the upper roll 22 is affixed to the swing arm 39, while the housing 43 for the lower roll is supported from the frame 12. The lobe reciprocating apparatus 40 also includes a spider 45 having a plate 46 affixed perpendicularly to the hub 41 and rotatable therewith. The spider 45 is provided with a central cup 47 and a plurality of smaller cups 48 uniformily positioned around the periphery of the plate 46. The number of the smaller cups 48 equals the number of the lobes 25 mounted on the corresponding conditioning roll 22, 23.

The lobe reciprocating apparatus 40 is connected directly to the core 32 of the corresponding roll 22, 23 by a shaft 52 affixed to the core 32 to be rotatable therewith and by the connecting rods 55. The shaft 52 is received within the central cup 47 by a spherical bearing 53, such as a ball joint, to accommodate the misalignment between the plane of the plate 46 and the shaft 52. Due to the connection between the connecting rods 55, the plate 46 rotates with the corresponding conditioning roll 22, 23. The angle of the plate 46 relative to being perpendicular to the axis of the shaft 52 defines the throw, or amount of transverse movement, induced to the lobes 25 corresponding thereto. The shaft 52 supports the end of the conditioner roll 22, 23 for rotative movement from the lobe reciprocating apparatus so that the respective conditioning rolls rotate about an axis of rotation corresponding to the shaft 52.

Interconnecting each of the smaller cups 48 with the corresponding lobe 25 is a connecting rod 55 detachably connected to the corresponding support tube 27, such as by being threadably received thereby. A nut 56 affixed to each respective support tube 27 could provide the means for threadably connecting the connecting rod 55. Each connecting rod 55 is then supported within the smaller cup 48 corresponding thereto by a universal connector, such as a balljoint 58, to accommodate the misalignment between the connecting rod 55 and the plate 46. The orientation of the plate 46 is such that the lobe 25 is moving constantly while in the throat area 24. The change in transverse direction of movement of the lobe 25 should occur prior to the lobe 25 engaging crop material in the throat 24, which can be accomplished by proper orientation of the plate 46.

In operation, the conditioning rolls 22, 23 are rotated through a conventional connection to the drive mechanism 19 and, in turn, rotatably drives the tilted plate 46 through the shaft 52. The plate 46, which is rotatably supported by the hub 41, cyclically rotates the smaller cups 48 from a position closer to the core 32 to a position further away from the core 32. Since the core 32 is rotatably supported at a fixed position relative to the frame 12 and since the lengths of the connecting rods 55 remains constant, the result is that the individual lobes 25 are moved transversely on the corresponding guide member 30 along the length of the core 32. Accordingly, as long as the conditioning roll 22, 23 is being rotatably driven, the lobes 25 thereof are being transversely moved. The lobe reciprocating apparatus 40 for the rolls 22, 23 are arranged such that the lobes 25 of the opposing rolls 22, 23 within the throat 24 in engagement with the crop material are moving in opposite directions.

The resulting conditioning action of the conditioning rolls 22, 23 is two-fold. The interaction between the intermeshed lobes 25 on the opposing rolls 22, 23 provides a conditioning action to the crop material being harvested along a longitudinal direction as the crop is fed between the counterrotating rolls 22, 23. The transverse movement of the lobes 25 within the throat 24 imparts a scuffing action to the crop material in engagement with the rolls along a transverse direction to further condition the crop material. It can be seen that this particular arrangement provides continuous movement of the lobes 25 while in engagement with the crop within the throat 24 which in turn provides a continuous conditioning action to the crop material, resulting in a more extensive, aggressive conditioning thereof.

Figure 5:
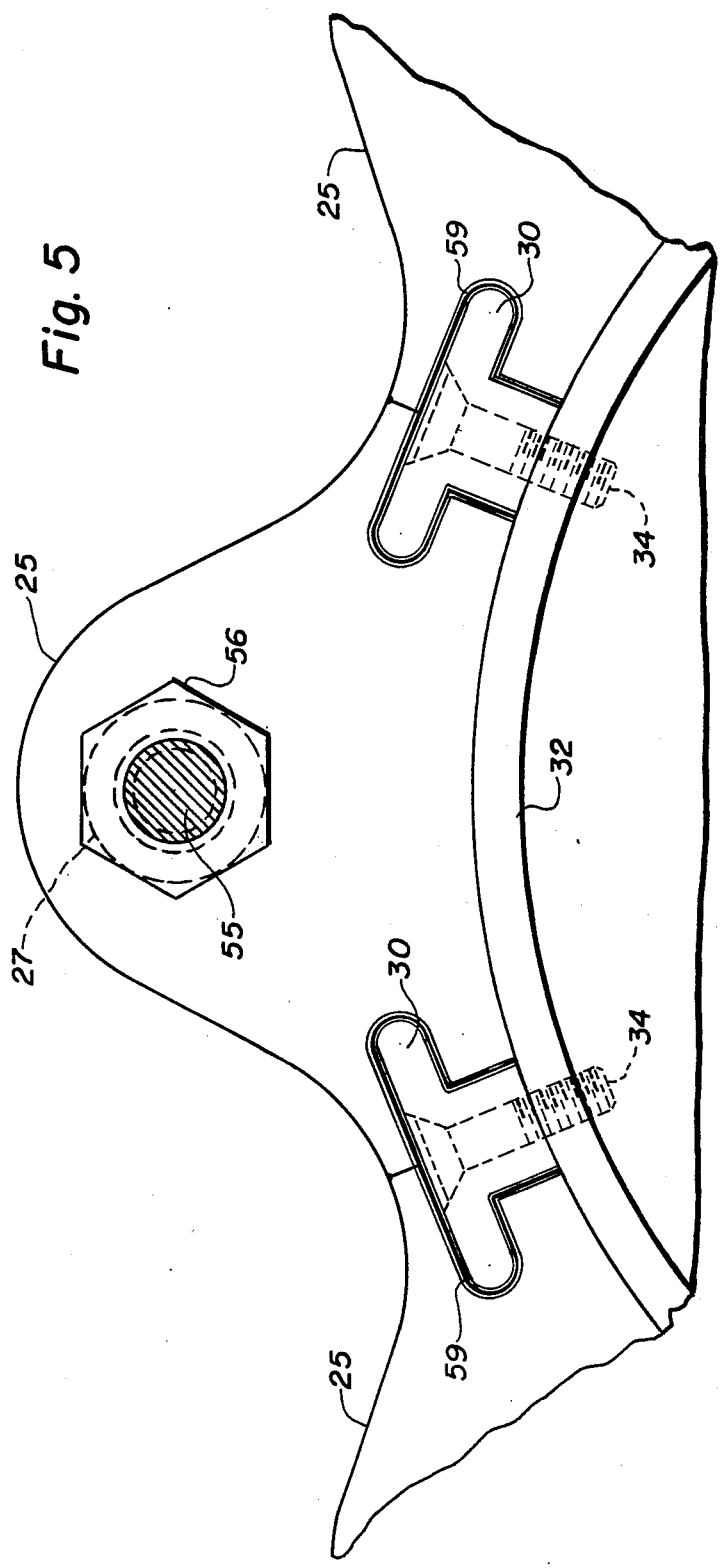
FIG. 5 is a view similar to that of FIG. 4 yet showing an alternative embodiment of the mounting of the reciprocal lobe on the conditioning roll core.

Referring now to FIGS. 4 and 5, alternative mounting arrangements for the lobes 25 can best be seen. The guide rail 30 is in the form of a "T" to stabilize the flexing thereof when the lobe 25 passes through the throat 24 in intermeshing engagement with the opposing roll with crop material therebetween. In the embodiment shown in FIG. 4, the lobe 25 is constructed with a T-shaped slot through the middle thereof to correspond to the T-shaped guide rail 30. The joint 57 between adjacent lobes 25 on the roll 22, 23 is located at the thinnest part of the lobes 25 to minimize the urethane-to-urethane contact. A slight clearance between adjacent lobes at the joint 57 is desireable to further minimize this contact which during operation builds up significant amounts of heat through friction. An optional bushing material 59 can be mounted on the guide rail 30 or bonded to the T-shaped slot of the lobe 25 to further facilitate the sliding movement of the lobe 25 along the guide rail 30. Furthermore, the joint 57 could be provided with an optional bushing material bonded to one of the adjacent lobes 25 to facilitate relative movement therebetween.

In the alternative mounting embodiment shown in FIG. 5, the T-shaped guide rail 30 is located at the joint between adjacent lobes 25, with a half T-shaped slot being formed in the opposing sides of the lobe 25 to accommodate the guide rail 30. This particular mounting configuration further minimizes any urethane-to-urethane contact, but subjects the guide rail 30 to contact with juices from the conditioned crop material through the slight clearance between the adjacent lobes 25 immediately above the guide rails 30. As shown in FIG. 4 and described above, the guide rails 30 could be provided with a bushing material if desired.

One skilled in the art will readily realize that the angle of the lobe reciprocating apparatus 40, or more specifically the angle of the plate 46, is shown in FIG. 3 as being merely representative, as is the phasing of the change of direction of the movement of the lobes 25. The exact angle of inclination relative to the axis of rotation of the conditioning rolls 22, 23 and the phasing thereof is dependent upon the specific orientation of the rolls, the amount of transverse movement of the lobes desired, and the manner of conditioning required. Although this angle of inclination could vary significantly for either one or both of the conditioning rolls 22, 23 from that shown in FIG. 3., the principles of the instant invention would remain as described above, so long as relative transverse movement between the conditioning rolls is attained within the throat area for conditioning of the crop material.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. A conditioning roll rotatably mountable in a harvesting machine to be cooperable with a second conditioning roll to form a throat therebetween and be operable to condition crop material fed through said throat, comprising:
   a core oriented generally transversely to the flow of crop material through said throat, said core having a circumference;
   guide means associated with said core and being spaced substantially equidistantly around the circumference of said core, said guide means being oriented generally transverse to the flow of crop material through said throat; and
   a plurality of lobes slidably mounted with respect to said guide means to permit reciprocal transverse movement of said lobes relative to said core, said lobes being connected to an oscillating mechanism to effect a transverse movement of each said lobe while in engagement with said crop material passing through said throat.

2. The conditioning roll of claim 1 wherein said core is rotatable during operation to pass each said lobe through said throat into engagement with crop material passing therethrough.

3. The conditioning roll of claim 2 wherein said oscillating mechanism is operable to transversely move said lobes upon rotation of said core.

4. The conditioning roll of claim 3 wherein each said lobe includes a support tube adapted for connection to said oscillating mechanism.

5. The conditioning roll of claim 4 wherein said lobes form a convoluted cross-sectional configuration which can be intermeshed with a like configuration of said second conditioning roll to condition the crop material passing through said throat.

6. The conditioning roll of claim 5 wherein said lobes continuously move transversely while in said throat to effect a conditioning action on the crop material passing therethrough.

7. In a crop harvesting machine operable to collect crop material from the field and pass said crop material through a conditioning mechanism for harvesting treatment, said conditioning mechanism having a pair of transversely extending, counterrotating conditioning rolls forming a throat therebetween for the passage of said crop material therethrough in engagement with said conditioning roll for conditioning of said crop material, the improvement comprising:
  one of said conditioning rolls having transversely movable lobes mounted around the periphery thereof; and
  an oscillating means operably connected to said lobes for effecting reciprocal transverse movement of said lobes while in engagement with said crop material passing through said throat.

8. The crop harvesting machine of claim 7 wherein said oscillating means effects reciprocal transverse movement of said lobes upon rotation of said one conditioning roll.

9. The crop harvesting machine of claim 8 wherein said lobes form a convoluted cross-sectional configuration for said one conditioning roll which intermeshes with an identical cross-sectional configuration for the other said conditioning roll.

10. The crop harvesting machine of claim 9 wherein each said lobe includes a support tube adapted for connection to said oscillating means.

11. The crop harvesting machine of claim 10 wherein said oscillating means includes a lobe reciprocating apparatus having a plate angularly disposed with respect to a plane perpendicular to the line of movement of said lobes, a connecting rod interconnecting said plate and each respective said lobe so as to be rotatable with said one conditioning roll.

12. The crop harvesting machine of claim 11 wherein said one conditioning roll has a core mounting said lobes and being rotatable therewith, said core being transversely fixed relative to said lobe reciprocating apparatus so that said plate transversely moves said lobes relative to said core.

13. The crop harvesting machine of claim 12 wherein said plate is provided with support cups housing ball joints receiving said connecting rods to accommodate misalignment between said connecting rods and said plate during rotation thereof.

14. The crop harvesting machine of claim 13 wherein both of said conditioning rolls are provided with transversely movable lobes connected to respective oscillating mechanisms to effect the transverse movement thereof.

15. The crop harvesting machine of claim 14 wherein each said lobe is made of urethane.

16. An oscillating mechanism connectable to a conditioning roll having a plurality of lobes equidistantly mounted around the circumference thereof for sliding movement parallel to the axis of rotation of said conditioning roll, said oscillating mechanism being operable to effect a reciprocal sliding movement of said lobes upon rotation of said conditioning roll, comprising:
  a hub journaled for rotation along a second axis non-parallel to the axis of rotation of said conditioning roll, said hub being spaced from said conditioning roll in general alignment with the axis of said conditioning roll;
  a plate affixed to said hub for rotation therewith in a plane perpendicular to said second axis such that a first portion of said plate is closer to said conditioning roll than a second portion of said plate; and
  connecting means interconnecting said plate and each of said lobes for transferring rotative motion between said conditioning roll and said plate and for transversely moving said lobes due to the connection thereof with said rotating plate oriented in a non-perpendicular rotating plane.

17. The oscillating mechanism of claim 16 wherein said plate is provided with a plurality of support cups spaced around the periphery of said plate and alignable with corresponding respective lobes on said conditioning roll, said connecting means including a connecting rod interconnecting each of said lobes with a ball joint housed within a corresponding one of said support cups.

18. The oscillating mechanism of claim 17 wherein said connecting means further includes a shaft affixed to said conditioning roll to be rotatable therewith and connected via a universal joint to a central portion of said plate to permit said plate to be rotatably driven with said conditioning roll.

19. The oscillating mechanism of claim 18 wherein said shaft supports said conditioning roll from said plate for rotation about said axis of rotation of said conditioning roll.

* * * * *